United States Patent

[11] 3,551,762

[72] Inventor Takio Naitoo
Yamanashi-ken, Japan
[21] Appl. No. 656,222
[22] Filed July 26, 1967
[45] Patented Dec. 29, 1970
[73] Assignee Hitachi, Ltd.
Tokyo, Japan,
a corporation of Japan
[32] Priority Aug. 5, 1966
[33] Japan
[31] No. 41/73680

[54] SEMICONDUCTOR DEVICE AND METHOD OF MAKING SAME
17 Claims, 7 Drawing Figs.

[52] U.S. Cl. .......... 317/236, 317/234
[51] Int. Cl. .......... H01l 1/08
[50] Field of Search .......... 317/236, 234.4

[56] References Cited
UNITED STATES PATENTS

| | | | |
|---|---|---|---|
| 2,832,016 | 4/1958 | Bakalar | 317/234X |
| 2,939,058 | 5/1960 | Masterson | 317/234X |
| 3,114,863 | 12/1963 | Dalton | 317/234X |
| 3,189,799 | 6/1965 | Moroney | 317/234X |
| 3,287,609 | 11/1966 | Bennett et al. | 317/234X |
| 3,311,800 | 3/1967 | Bakalar | 317/234X |

*Primary Examiner*—James D. Kallam
*Attorney*—Craig, Antonelli, Stewart & Hill

ABSTRACT: An encased semiconductor device comprising a cylindrical case of glass have an opening at one end and a leadout wire to which a semiconductor pellet is mounted on the other end, a whisker contacting to said pellet, and a glass bead adapted to said opening, said bead having a lead connected to said whisker and being partially welded along the inner wall of said opening, and the remaining part of said bead serving as a guide for maintaining said whisker in a right position, and a method of making the semiconductor device.

INVENTOR

TAKIO NAITOO

BY Paul M. Craig, Jr

ATTORNEY

INVENTOR
TAKIO NAITOO
BY Paul M. Craig, Jr.
ATTORNEY

SEMICONDUCTOR DEVICE AND METHOD OF MAKING SAME

This invention relates to a semiconductor device and more particularly to a semiconductor device comprising an improved sealing structure and a method of making the same.

It is generally considered to be desirable to seal a semiconductor device hermetically by some method. For example, in a sealing structure, as employed in a diode of glass sealing type, which consists of a case for containing a semiconductor element having an open end and a sealing member which hermetically seals said element within the case by being adapted to said open end and supports an electrode body extending out of the case as a lead connecting to said element in a predetermined relation, said case and said sealing member are made of glass and they are easily welded by heating said adapted part to seal the case completely.

In said diode, a lead connected to one of the electrodes of semiconductor element through said sealing member and a lead connected to the other electrode and derived from said case are usually arranged in a coaxial form with the aid of said case and said sealing member. Particularly, in a point contact diode, one of said two leads (this is generally called a whisker) has a spring action and is fixed while applying a certain amount of pressure to the surface of said element to which said other lead made of relatively strong metal material is connected, and thus it is desirable to arrange said two leads coaxially. Further, in a point contact diode, it is not always required to arrange the two leads coaxially as described above. However, since the whisker presses the semiconductor surface, the whisker must be placed vertically to the semiconductor surface unless other special means are provided.

Accordingly, in said sealing structure, the adaptation of said sealing member to the open end and the pressurized contact of the whisker supported by said sealing member to the surface of the semiconductor element are done simultaneously to raise the production efficiency and then the interface between the sealing member and the case are welded by heating to provide hermetical sealing.

However, though the operations for sealing and construction are simple in said structure, the welded part has a great flexibility at and just after heating and moreover the force arising from the spring action of the whisker acts and thus it is difficult to contact the whisker at the right position (desired electrical characteristics and mechanical strength may not be obtained) and the external appearance when completed is likely to be bad.

Accordingly, an object of the invention is to provide a semiconductor device having good electrical characteristics by improving the sealing part.

Another object of the invention is to provide a method of making a semiconductor device which includes a reliable sealing method and is suitable for mass production.

A further object of the invention is to provide a method of making a semiconductor device suitable for mass production which includes a reliable sealing method and a method of assembly performed simultaneously therewith.

A yet further object of the invention is to provide a stable and reliable semiconductor device having desired mechanical strength and a method of making the same.

Other objects, features and advantages of the invention will become more apparent from the following detailed description of invention when taken in conjunction with the accompanying drawings, wherein:

FIG. 1 is a sectional diagram showing the structure of a point contact diode fabricated according to the prior art and the method of making the same;

FIGS. 2*a*, 2*b* and 2*c* are sectional diagrams showing the structure and the manufacturing processes of a point contact diode according to an embodiment of the invention;

Figures 1, 2A, 2B, 2C:
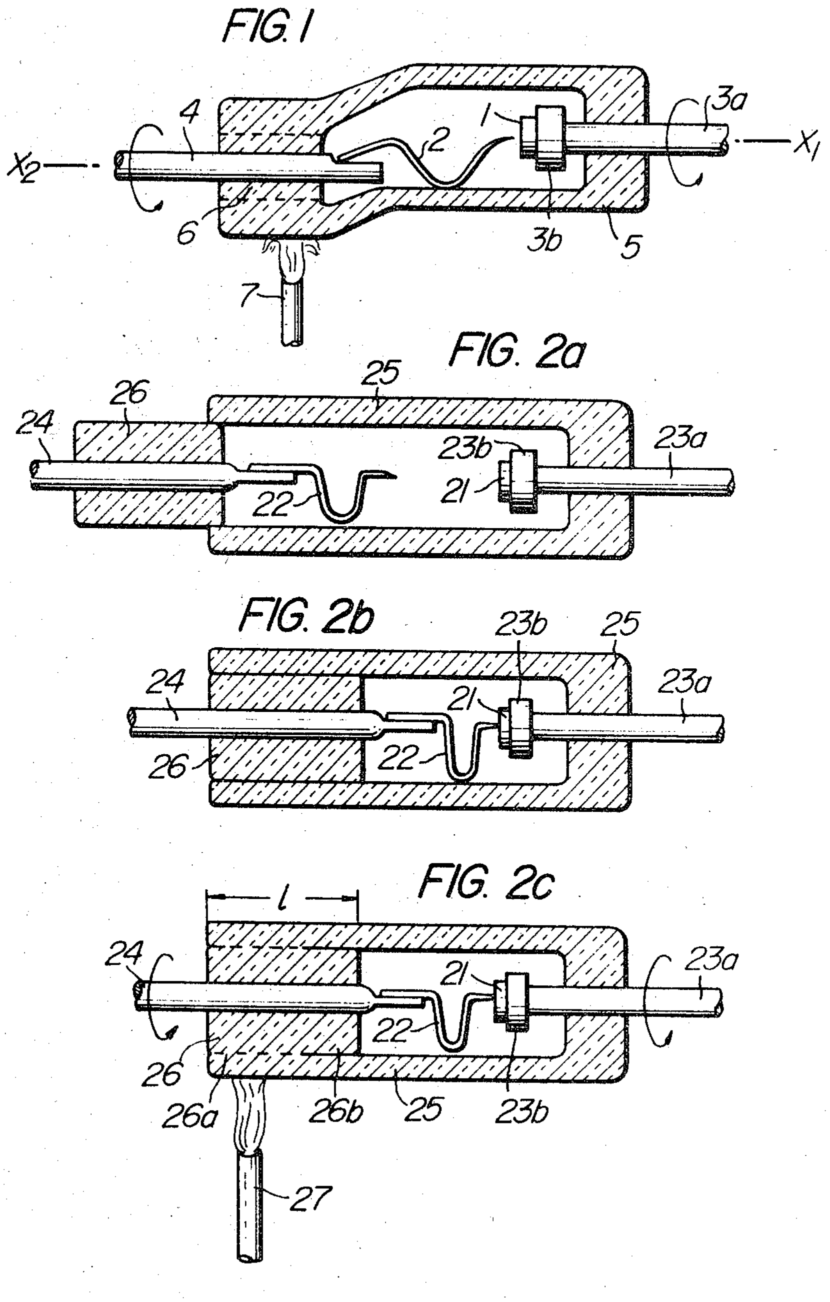

For a better understanding of the invention, an example of the prior art will be sketched with reference to FIG. 1. FIG. 1 shows a point contact diode, wherein 1 indicates a semiconductor body or pellet, 2 designates a whisker, 3*a* a lead comprising a base 3*b*, 4 a lead connecting to the whisker 2,5 a glass case and 6 a sealing member made of glass which seals the open end of the case 5 and supports said lead 4 in a predetermined relation with the inner wall of the case and the semiconductor pellet 1. Reference numeral 7 indicates a burner being the heating means for welding said sealing member and the inner wall of the case 5. When welding shear appears between the axes $T_1$, $X_2$, of the lead wires 3*a* and 4 and at the same time twist occurs at the glass sealing part as shown in the FIG., and thus the contact whisker may not be positioned vertically to the crystal surface, and may be displaced from the center of the crystal surface of the contact whisker may be removed from the lead 4. As a result, the characteristics of the semiconductor device may be altered. Further, the flexibility of the welded part causes the variation of the external appearance of the diode and has been a great problem in mass production.

This invention is intended to obviate the deficiencies described above by improving the sealing part. The main feature of the invention consists in performing said welding partly and in using a part of said support and sealing member as a guide. This is shown in an embodiment of the invention. In another embodiment of the invention, the part where the whisker and the lead are set (they are set, for example, by spot welding) is covered with said support member to strengthen the same.

EXAMPLE 1

The first embodiment of the invention is shown in FIGS. 2*a*, 2*b* and 2*c*. This point contact diode has a structure wherein the head of the hard contact whisker 22 which is made of tungsten, etc. and a part of which is formed into a C shape is made into contact with the crystal surface made by polishing the surface of the germanium or silicon semiconductor pellet 21, leads 23*a* (23*b* is a base for setting the pellet 21) and 24 formed of dumet wires are put into contact with the pellet 21 and the contact whisker 22, respectively, and said pellet 21 and the contact whisker 22 are sealed with the glass case 25 and the glass bead 26 which fix said lead wires.

The manufacturing method of said diode will now be described with reference to FIGS. 2*a* to 2*c* The sealing member 26 made of glass which includes the lead 24 connected to the contact whisker 22 adapted to the open end of the case shown in FIG. 2*a* is made as follows. The head of the dumet wire to be used as the lead 24 is pressed flatwise, and said wire is passed through the glass bead having a hole and they are welded at about 1000° c. Then, the base of the whisker 22 formed into a C shaped is set to the dumet wire by electric welding or by burying with mechanical pressure. The size of said glass sealing member is made rather long and, for example, a glass bead of 1.5–4mm which is longer by 0.5–2mm than the conventional ones is fixed to the dumet wire. The glass bead having the contact whisker is inserted deeply enough into the glass case 25 as shown in FIG. 2*b* When sealing the end of the case, the end of the case is heated concentrically with the burner 27 while rotating the diode as shown in FIG. 2*c* and only that part (shown by a dotted line 26*a*) is welded. The another end portion 26*b* of the glass bead 26 is maintained at a temperature at which said part is not softened and therefore said part is not welded. Thus, since the end portion 26*b* of the glass bead is fixed firmly in the case even when the sealing part of the glass case is softened, it is possible to maintain a right angle and position of the contact whisker connected to the lead with respect to the crystal surface by using the glass bead as a guide even when an external force which shifts the axes of the two leads is applied during welding.

EXAMPLE 2

Figure 3:
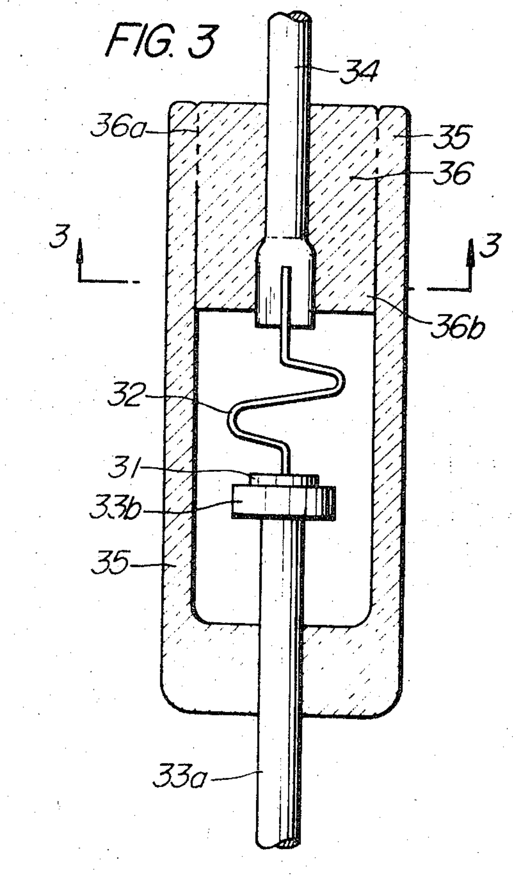
FIG. 3 shows a sectional diagram of a point contact diode according to another embodiment of the invention.
Figure 4:
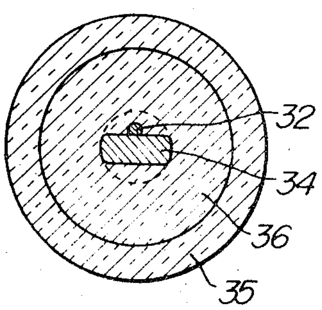
FIG. 4 is a sectional diagram showing the 3–3 section of the diode shown in FIG. 3.

FIGS. 3 and 4 show the second embodiment of the invention. In this embodiment, the part where the lead 34 and the contact whisker 32 are in contact is covered with the glass bead in advance. The other parts have the same structure as that explained with reference to FIGS. 2*a* to 2*c* and the method of manufacture is also the same. However, the whisker has an S-shaped part. In this embodiment, since the inner end part 36*b* of the glass bead working as a guide is sufficiently long, it is possible to prevent the deformation of the case due to the softening of the case wall and since the part where the contact whisker 32 and the lead 34 are in contact is covered with the inner end part 36*b*, it is effective for mechanically strengthening the adherence between the contact whisker 32 and the lead 34.

EXAMPLE 3

Figure 5:
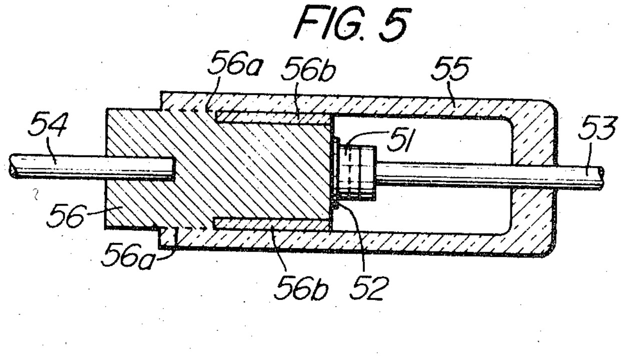
FIG. 5 is a sectional diagram of another diode embodying the present invention.

FIG. 5 shows the third embodiment of the invention. Reference numeral 51 indicates a silicon semiconductor pellet having a PN junction (shown by a dotted line), 52 indicates solder material for connecting said pellet to the support member 56, 53 the first lead, 54 the second lead, 55 a glass case, 56 a support member of Cu or Fe-Ni-Co alloy, 56*a* a welded part, and 56*b* a guide part (made, for example, of a ceramic ring). In such a structure, the melting point of the solder is chosen to be equal to or near the temperature at which the glass case is softened and welded to the support member. In this case, the heat for welding melts the solder 52 and it is possible to connect the semiconductor pellet 51 to the support member 56. The ceramic ring 56*b* is also effective for preventing the high thermal conduction of the metal support member and for fulfilling the guide function of the guide part.

According to the embodiments of the invention as described hereinabove, the displacement of the contact whisker or the connector with respect to the semiconductor pellet surface due to the bending of the sealing part of the diode does not occur, and a stable and reliable diode can be provided. The external appearance of the diode is uniform and the irregularity of size is reduced remarkably and thus the production efficiency is improved.

Though several embodiments are described hereinabove, it is needless to say that the present invention can be applied to the case where a case like a metal case is sealed with a glass bead.

In this case, only one part of the glass bead is melted and welded to the metal case. In the prior art, on the other hand, the whole glass bead is melted and when an external force is applied while melting, the direction of the lead wire is changed. However, this deficiency is solved in a device according to the invention.

When an insulating case is used, it is possible to melt and seal only the glass bead by changing the glass material or by using ceramics.

It is also possible to use metal having a low melting point like solder instead of said glass bead.

Though the invention is described only in case of its application to diodes, it is evident that the invention can be applied to other semiconductor devices like a phototransistor, a thermistor and the like.

I claim:

1. A semiconductor device comprising:
- an elongated insulator case of U-shape having an opening at one end;
- a semiconductor pellet having at least an input and an output and means for supporting said pellet;
- at least a first and a second conductor electrically connected to said input and said output, respectively;
- a sealing means disposed in said opening, securing at least one of said conductors in position and hermetically sealing said case, and
- said sealing means comprising a guide portion and a seal portion elongated along an interior wall, said guide portion in unsealed contact with said interior wall portion of said case interior of the opening, said seal portion being fused to said interior wall and hermetically sealing the open end of the case, whereby the guide portion maintains said one conductor in position during hermetic sealing of the case.

2. A semiconductor device as described in claim 1, wherein said sealing means is a conductor and acts as one of said conductors.

3. A semiconductor device as described in claim 1, wherein said sealing means is insulator and one of said conductors extends hermetically out of said opening of said case through said sealing means.

4. A semiconductor device as described in claim 3, wherein the conductor extending from said opening through said sealing means consists of a third conductor protruding out of said case and a fourth conductor located in said case having one end in contact with said first conductor and the other end connected to said semiconductor pellet.

5. A semiconductor device as described in claim 4, wherein said sealing means covers the junction between the third and fourth conductors.

6. A semiconductor device as described in claim 4, wherein the junction between said third and fourth conductors is formed in such a way that one of said conductors is inserted into the other.

7. A semiconductor device as described in claim 4, wherein said case is a hollow cylinder, said sealing means is columnar, the junction between said third and fourth conductors is covered with said columnar sealing means and said first conductor is derived outwards along the coaxial axis of said columnar sealing means.

8. A semiconductor device as described in claim 4, wherein said fourth conductor is a whisker.

9. A semiconductor device as described in claim 1, wherein said case has an additional opening, and one of said conductors extends hermetically from said case through said additional opening.

10. A semiconductor device as described in claim 1, wherein said semiconductor pellet comprises at least one rectifying junction.

11. A semiconductor device as described in claim 1, wherein said case and sealing means consist of glass.

12. A semiconductor device as described in claim 1, wherein said case is of a hollow cylinder and that said sealing means is of columnar form.

13. A semiconductor device as described in claim 1, wherein said means for supporting said pellet is also at least one of said conductors.

14. A semiconductor device comprising:
- a. a hollow cylindrical case having a first opening at one end and a second opening at the other end;
- b. a first lead wire extending hermetically out of said case through said first opening;
- c. a semiconductor pellet attached to said first lead wire;
- d. a second lead wire, one end of which contacts the surface of said semiconductor pellet and the other end of which extends toward said second opening;
- e. a third lead wire connected to said second lead wire and extending through said second opening; and
- f. an insulating seal means disposed in said second opening and elongated along are an interior wall of said case, said sealing means comprising a guide portion in unsealed contact with said interior wall portion of the case interior of said second opening and a seal portion in contact with said interior wall portion hermetically sealing the second opening of the case, said sealing member covering the connected part between said second and third lead wires so as to strengthen the connection therebetween thereby to seal said pellet hermetically in said case.

15. A semiconductor device as described in claim 14, wherein said second lead wire includes a metal which exhibits a rectifying property when brought into contact with said semiconductor pellet and said metal contacts said semiconductor pellet.

16. A semiconductor device as described in claim 14, wherein said sealing means is made of glass.

17. A semiconductor device comprising:

a cylindrical conductor;

a semiconductor element having two electrodes, one of which is connected to said conductor;

an insulating U-shaped hollow cylinder having an opening at one end, said conductor disposed in said opening, said cylinder consisting of a material adhesive to said conductor, the circumferential surface of the conductor including a portion which is integrally welded to an inner wall portion of said cylinder so as to hermetically seal said opening of said hollow cylinder and a guide part in continuous contact but not welded to the inner wall of said hollow cylinder apart from said one end of said cylinder; and a conductor connected to the other electrode of said element and extending hermetically out of the case through an additional opening.